Nov. 12, 1968    D. W. NEALE    3,410,192
MOTOR VEHICLE EXHAUST DEFLECTORS
Filed Jan. 10, 1967    2 Sheets-Sheet 1

INVENTOR:
DAVID WARWICK NEALE
BY Kurt Kelman
AGENT

United States Patent Office 3,410,192
Patented Nov. 12, 1968

3,410,192
MOTOR VEHICLE EXHAUST DEFLECTORS
David Warwick Neale, Stourport, England, assignor to Raydyot Limited, Old Hill, England, a British company
Filed Jan. 10, 1967, Ser. No. 608,300
Claims priority, application Great Britain, Feb. 17, 1966, 6,947/66
2 Claims. (Cl. 98—2)

ABSTRACT OF THE DISCLOSURE

An inverted channel-shaped body having means for securing the same to the terminal portion of a tail pipe. Spaced parallel louvres extend transversely in the rear portion of the body and are disposed in downwardly and rearwardly slanting planes so as to deflect exhaust gases downwardly and rearwardly toward the ground.

---

This invention relates to motor vehicle exhaust deflectors for attachment to a vehicle exhaust pipe or tail pipe to deflect exhaust gases away from the vehicle bodywork.

Conventional exhaust deflectors have a considerable projection beyond the exhaust pipe when fitted and are liable to be noisy, possibly due to vibration, back pressures and other causes.

Objects of the present invention are to provide a particularly neat exhaust deflector which overcomes one or both of the above disadvantages.

In accordance with the present invention a motor vehicle exhaust deflector comprises a body for attachment to an exhaust pipe and adapted to extend around a major peripheral part of the exhaust pipe when attached thereto, and a set of louvres carried by the body and arranged relative to the latter to deflect the normal flow of gases discharged from the exhaust pipe.

A preferred embodiment of the invention is now particularly described with reference to the accompanying drawings, wherein.

Figure 1:
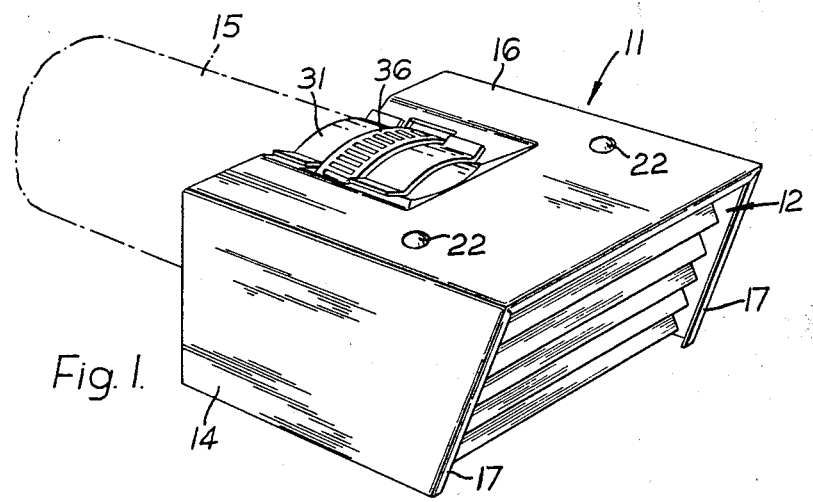
FIGURE 1 is a front perspective view of an exhaust deflector according to the invention, shown secured to an exhaust pipe.
Figure 2:
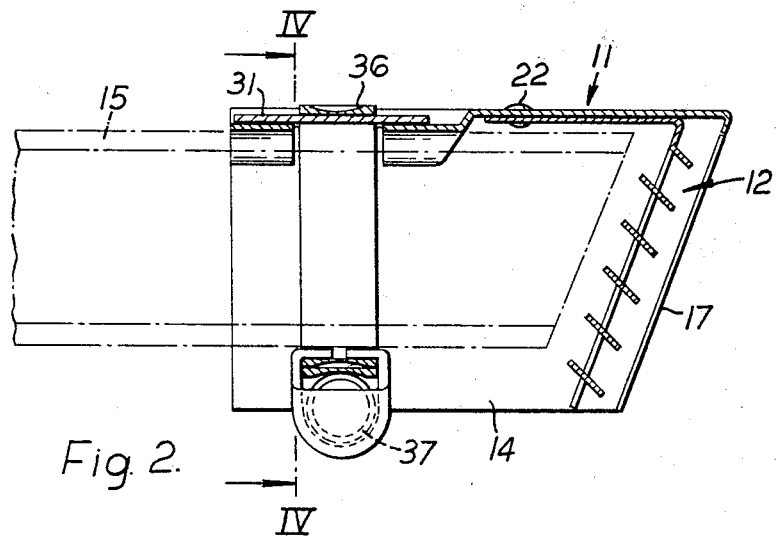
FIGURE 2 is a sectional elevation of the deflector of FIGURE 1.

Referring initially, particularly to FIGURES 1 and 2, the exhaust deflector comprises a body 11 and a louvred member 12.

The body 11 is a metal pressing and has a rectangular channel section and the louvred member 12 is a metal pressing or casting and is attached to the body to close one end of the channel.

In use, the parallel sides 14 of the body lie on opposite sides of an exhaust pipe 15 and the connecting top 16 lies over the exhaust pipe, the lower side of the pipe remaining uncovered.

Each parallel side 14 has an inclined edge adjacent the closed end of the body, the inclination being acute to the plane of the connecting top 16. The marginal edges 17 of the channel at the closed end of the body are inturned to provide a neat appearance and for strength.

The louvred member 12 comprises a louvred part 20 and an attachment part 21 (FIGURE 2) in a single, angled pressing or casting. The louvred part 20 comprises a frame 23 supporting a set of louvres 24. The attachment part 21 is fastened to the connecting side by rivets 22, (or by spot-welding or the like) so that the frame 23 extends adjacent and parallel to the inclined edges of the channel parallel sides 14.

The louvres 24 are constituted by a series of parallel plates mounted in the frame 23, each louvre being inclined to the frame. The angle between the frame 23 and the attachment part 21 is such that the frame 23 bisects the angle between the axis of the exhaust pipe and the desired direction of the issuing stream of gases after deflection. The louvre throats can thereby be of maximum area with minimum obstruction to the gas stream. The desired direction of the issuing stream is at a downward inclination sufficient to carry the exhaust gases away from the motor vehicle.

Figure 3:
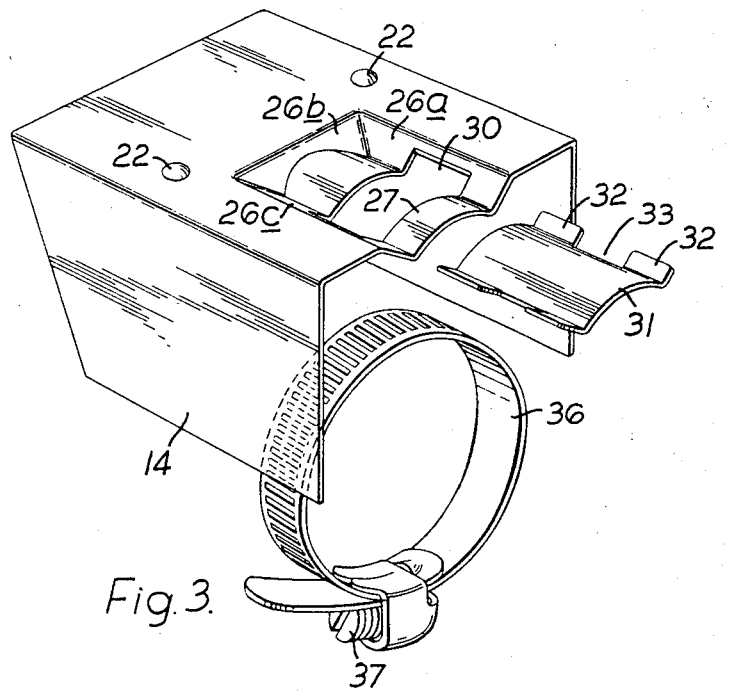
FIGURE 3 is a rear, perspective view of the deflector prior to being secured to the exhaust pipe.
Figure 4:
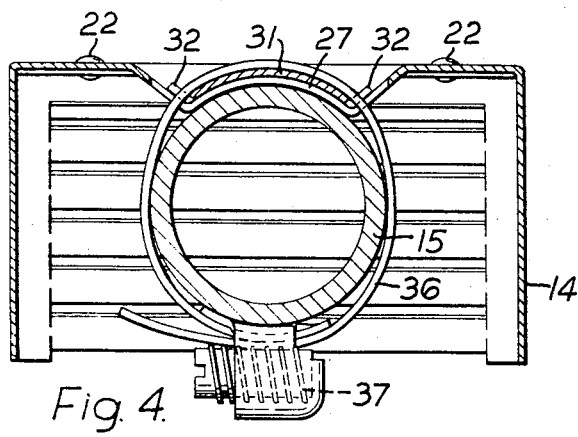
FIGURE 4 is a section on line IV—IV of FIGURE 2.

The connecting top 16 of the body has a recess adjacent the open end (FIGURES 3 or 4) defined by three inclined walls 26a, b and c and a base forming an attachment part 27, the latter being arcuately shaped and arranged to seat on the vehicle exhaust pipe over a discrete length thereof (along the pipe axis) and over an arc around a portion of the pipe periphery (FIGURE 4).

A slot 30 is formed in the arcuate attachment part 27, extending substantially normally of the parallel sides 14 of the body, and also extending beyond the arcuate attachment part 27 into the two oppositely adjoining inclined walls 26a and 26c.

A bridging member 31 has a part-cylindrically shaped portion to seat on the base 27 of the recess so as to bridge the slot 30, and has a pair of lugs 32 extending from each parallel side of the part-cylindrical portion and inclined thereto, to seat on the opposed inclined walls 26a and 26c of the body recess. A rebate 33, substantially of a length equal to the slot 30 width, is defined between each pair of lugs 32.

The deflector is secured to an exhaust pipe by a contractible band clip 36, for example worm-driven 37. An arcuate portion of the band clip 36 is located to extend through the slot 30 in the body 11 and the bridging member 31 is then inserted between the clip 36 arcuate portion and the body 11 so as to bridge the slot 30. The band clip 36 is then passed over the pipe 15 with the body 11 located over the end of the pipe. On tightening of the band clip 36 about the exhaust pipe 15 by means of the worm 37, the body of the deflector is clamped between the bridging member 31 and the exhaust pipe 15 with the band clip 36 seating in the rebates 33 between the lugs 32. The lugs 32 serve to prevent excessive relative movement between band clips 36 and the bridging member 31 and also serve to prevent lateral movement of the bridging member 31 relative to the arcuate attachment.

Hence, the deflector can be particularly easily secured to an exhaust pipe without any necessity to thread the band clip through slots in the deflector body.

However, a pair of slots can be provided in the body if required so that the bridging member can be dispensed with.

As the deflection of the gases is produced by the louvres, the deflector is efficient even with the exhaust pipe end in contact with the louvred member so that there need be very little extension of the deflector beyond the end of the pipe.

I claim:
1. An exhaust deflecting attachment for motor vehicle tail pipes, said attachment comprising an inverted channel-shaped body having an open front and an open bottom and including a pair of transversely spaced side walls and a connecting top wall, means carried by said body for securing the same to the terminal portion of a tail pipe in tail pipe surrounding relation, and a set of spaced parallel exhaust deflecting louvres extending transversely between said side walls in the rear portion of said body and against the open front, said louvres being disposed in downwardly and rearwardly slanting planes with each louvre having a front edge at a higher elevation than its rear edge, whereby to deflect exhaust gases downwardly and rearwardly toward the ground.

2. The device as defined in claim 1 wherein said louvres are struck out from a plate disposed in the rear portion of said body, said plate having an angulated top mounting portion underlying and secured to said top wall.

References Cited

UNITED STATES PATENTS

| 1,674,535 | 6/1928 | Verville | 98—2 XR |
| 2,089,496 | 8/1937 | Liber | 98—2 |
| 2,308,607 | 1/1943 | Jackson | 285—253 XR |
| 2,681,608 | 6/1954 | Wunderlich | 98—2 |

FOREIGN PATENTS 476,787  12/1937  Great Britain.

ROBERT A. O'LEARY, *Primary Examiner.*

M. A. ANTONAKAS, *Assistant Examiner.*